US006489982B2

(12) United States Patent
Ishibe

(10) Patent No.: US 6,489,982 B2
(45) Date of Patent: Dec. 3, 2002

(54) ERROR REDUCTION IN A MULTI-BEAM SCANNING OPTICAL SYSTEM, AND IMAGE-FORMING APPARATUS USING THE SAME

(75) Inventor: Yoshihiro Ishibe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/729,280

(22) Filed: Dec. 5, 2000

(65) Prior Publication Data

US 2001/0015747 A1 Aug. 23, 2001

(30) Foreign Application Priority Data

Dec. 10, 1999 (JP) .............................. 11-351515
Nov. 27, 2000 (JP) ....................... 2000-359562

(51) Int. Cl.⁷ .................................... B41J 2/39
(52) U.S. Cl. ..................... 347/134; 347/241; 359/204
(58) Field of Search ................... 347/129, 134, 347/234, 235, 241, 243, 244; 359/204, 205

(56) References Cited

U.S. PATENT DOCUMENTS 5,966,231 A * 10/1999 Bush et al. .................. 359/204
5,995,131 A * 11/1999 Fujibayashi et al. ........ 347/258
6,057,953 A * 5/2000 Ang ............................ 359/204
6,133,935 A * 10/2000 Fujibayashi et al. ........ 347/258

* cited by examiner

Primary Examiner—Joan Pendegrass
(74) Attorney, Agent, or Firm—Fitzpatrick, Cella, Harper & Scinto

(57) ABSTRACT

A multi-beam scanning optical system which obtains an image by reducing an error between the imaging positions of light beams from a plurality of light sources without any complicated adjustment, and an image-forming apparatus using the same. The multi-beam scanning optical system includes the elements of a first optical system for converting divergent light beams emitted from a light source means having a plurality of light sources into substantially parallel light beams or convergent light beams, a second optical system for forming the light beams converted into the substantially parallel light beams or convergent light beams into linear images elongated in the main scanning direction, a deflector for reflecting/deflecting incident light beams in the main scanning direction, a stop for limiting the width of incident light beams, and a third optical system for forming the light beams reflected/deflected by the deflector into images on a scanned surface and making the deflecting surface and the scanned surface substantially conjugate to each other in a sub-scanning cross-section. The respective elements are set to satisfy a conditional expression which includes the interval between light sources in the main scanning direction, the focal length of the collimator lens, the distance from the stop to the surface of the deflector, the focal length of the imaging optical system in the main scanning direction, and the number of pixels per inch on the scanned surface in the main scanning direction.

9 Claims, 8 Drawing Sheets

ERROR REDUCTION IN A MULTI-BEAM SCANNING OPTICAL SYSTEM, AND IMAGE-FORMING APPARATUS USING THE SAME

BACKGROUND OF THE INVENTION

1. Field of the Invention

The present invention relates to a multi-beam scanning optical system and an image forming apparatus using the same and, more particularly, to a multi-beam scanning optical system suitably used for an image forming apparatus applicable to any of monochrome image and color image, e.g., a laser beam printer or digital copying machine, which can attain a high operation speed and high recording density by using a light source means with a plurality of light sources.

2. Related Background Art

FIG. 7 is a sectional view (main scanning sectional view) of the main part of a conventional multi-beam scanning optical system in the main scanning direction.

Referring to FIG. 7, a plurality of light beams emitted from a multi-beam semiconductor laser (multiple light sources) 71 having a plurality of light sources (light-emitting units) are converted into substantially parallel light beams or convergent light beams by a collimator lens 72, and the light beams strike a cylindrical lens 74 while the cross-sectional area of the light beams is limited by an aperture stop 73. Of the light beams incident on the cylindrical lens 74, light beams in a main scanning cross-section emerge without any change. In a sub-scanning cross-section, light beams converge and are formed into almost linear images (elongated in the main scanning direction) on a deflecting surface (reflecting surface) 75a of an optical deflector 75. Note that each of the collimator lens 72, aperture stop 73, cylindrical lens 74, and the like forms one element of an incidence optical system. A plurality of light beams reflected/deflected by the deflecting surface 75a of the optical deflector 75 are formed into spots on a photosensitive drum surface 77 by an imaging optical system (f–θ lens system) 76. By rotating the optical deflector 75 in the direction indicated by an arrow C, these light beams are scanned on the photosensitive drum surface 77 at a constant speed in the direction indicated by the arrow D (main scanning direction). With this operation, an image is recorded on the photosensitive drum surface 77 serving as a recording medium.

In such a multi-beam scanning optical system, to accurately control the write position of an image, a write position sync signal detection means is generally arranged immediately before an image signal write position.

Referring to FIG. 7, a bending mirror (BD mirror) 78 reflects, toward the BD sensor 81 side, a light beam (BD light beam) for detecting a write position sync signal for adjusting the timing at a scanning start position on the photosensitive drum surface 77. A slit (BD slit) 79 is located at a position equivalent to the photosensitive drum surface 77. A BD lens 80 serving as an imaging means makes the BD mirror 78 and BD sensor 81 optically conjugate to each other, thereby correcting a tilt of the surface of the BD mirror 78. The optical sensor (BD sensor) 81 serves as a write position sync signal detection element. Note that each of the BD slit 79, BD lens 80, BD sensor 81, and the like forms one element of a write position sync signal detection means 91.

Referring to FIG. 7, the timing at a scanning start position for image recording on the photosensitive drum surface 77 is adjusted by using an output signal from the BD sensor 81.

In this multi-beam scanning optical system, as shown in FIG. 8, if a plurality of light sources (light-emitting units) A and B are placed vertically in the sub-scanning direction, the distance between scanning lines on a scanned surface in the sub-scanning direction becomes much larger than the recording density. For this reason, in general, as shown in FIG. 9, the plurality of light sources A and B are placed obliquely in the sub-scanning direction with respect to the main scanning direction, and a tilt angle δ is adjusted to accurately match the distance between the scanning lines on the scanned surface in the sub-scanning direction to the recording density.

If a relative wavelength error occurs in light beams emitted from the plurality of light sources, relative focus errors occur on the scanned surface in the main and sub-scanning directions in correspondence with the respective light-emitting units, resulting in a deterioration in image quality. For this reason, a collimator lens having undergone proper chromatic aberration correction is used to prevent relative focus errors in the main and sub-scanning directions from occurring even if a relative wavelength error occurs in light beams emitted from a plurality of light sources, thereby effectively preventing a deterioration in image quality.

In the multi-beam scanning optical system having the conventional arrangement described above, since a plurality of light sources are placed obliquely in the sub-scanning direction with respect to the main scanning direction, light beams emitted from the light sources A and B strike the deflecting surface of the optical deflector (polygon mirror) at positions spaced apart from each other in the main scanning direction, and are reflected/deflected by the optical deflector at different angles, as shown in FIG. 10. As a consequence, spots are formed on the scanned surface 77 at positions spaced apart from each other in the main scanning direction (beams A1 and B1).

In the multi-beam scanning optical system having this arrangement, therefore, image data are sent with a timing shift of a predetermined time δT such that a light from a given reference light source is formed into an image on the scanned surface, and then a light beam from another light source is formed into an image at the same imaging position.

Referring to FIG. 10, when the timing shifts by δT, the deflecting surface 75a is set at the angle of a deflecting surface 75b. At this time, a beam B2 is reflected/deflected by the deflecting surface 75b in the direction indicated by an arrow B2', i.e., in the same direction indicated by an arrow A1' as that of the beam A1, thereby matching the imaging positions of the respective spots to each other.

Consider a case wherein a focus error occurs in the main scanning direction due to some cause, e.g., a positional error between the scanned surface and the optical unit holding the optical system or a mounting error in mounting an optical component in the optical unit. Assume, in this case, that a normal position 77a of the scanned surface 77 shifts to a position 77b. In this case, as is obvious from FIG. 10, the imaging position of each beam shifts in the main scanning direction by δY.

In the prior art, when the imaging positions of light beams from a plurality of light sources (multi-beam semiconductor laser) shift in the main scanning direction, the printing precision and image quality deteriorate.

There are various factors that cause focus errors in the main scanning direction. It is very difficult to reduce all these factors to zero. Even if such adjustment is to be made, the adjustment process will cost much. In addition, recently, an optical system having an f–θ lens made of a plastic material is often used in consideration of cost. A plastic lens is manufactured by injection molding. The surface precision of this lens is inferior to that obtained by polishing optical glass. In such plastic lens, in particular, errors tend to occur in some portions in convex forms with respect to design values, but errors tend to occur in other portions in concave forms with respect to design values. When focus errors are caused by such surface precision errors, it is impossible to correct the focus errors throughout the scanned surface. It is therefore difficult to correct a deterioration in image quality due to the occurrence of errors in the imaging positions of light beams from a plurality of light sources in the main scanning direction.

It is an object of the present invention to provide an multi-beam scanning optical system which can effectively reduce errors in the imaging positions of light beams from a plurality of light sources in the main scanning direction and obtain a high-quality image at high speed, without requiring any complicated adjustment, by properly setting the respective elements of the multi-beam scanning optical system, and an image forming apparatus using the multi-beam scanning optical system.

SUMMARY OF THE INVENTION

According to an aspect of the present invention, there is provided a multi-beam scanning optical system comprising light source means having a plurality of light sources spaced apart from each other at least in a main scanning direction, a collimator lens for converting a plurality of divergent light beams emitted from the light source means into substantially parallel light beams or convergent light beams, deflection means for reflecting/deflecting the plurality of light beams in the main scanning direction, a stop which is interposed between the collimator lens and the deflection means to limit a width of incident light beams, and an imaging optical system for forming the plurality of light beams reflected/deflected by the deflection means into images on a scanned surface and making the deflecting surface and the scanned surface substantially conjugate to each other in a sub-scanning cross-section, wherein letting S1 be an emission point interval between the plurality of light sources in the main scanning direction, f1 be a focal length of the collimator lens, L1 be a distance from the stop to the deflecting surface of the deflection means, f3 be the focal length of the imaging optical system in the main scanning direction, and N1 be the number of pixels per inch on the scanned surface in the main scanning direction, a condition given by $$\frac{S1 \times L1}{f1 \times f3} \leq \frac{25.4}{N1} \times \frac{1}{4}$$

is satisfied.

According to another aspect of the present invention, the multi-beam scanning optical system further comprises write position sync signal detection means for controlling a timing at a scanning start position on the scanned surface by using one of the plurality of light beams reflected/deflected by the reflection means, and controls the timing at the scanning start position on the scanned surface with respect to one of the plurality of light beams emitted from the light source means.

According to still another aspect of the present invention, the multi-beam scanning optical system further comprises write position sync signal detection means for controlling a timing at a scanning start position on the scanned surface by using all the plurality of light beams reflected/deflected by the reflection means, and controls the timing at the scanning start position on the scanned surface with respect to the plurality of light beams emitted from the light source means.

According to still another aspect of the present invention, the write position sync signal detection means has a slit, and the slit can move in a direction of the center of a light beam incident on the slit.

According to still another aspect of the present invention, the write position sync signal detection means has a slit, and the slit can pivot within a cross-section substantially perpendicular to the center of a light beam incident on the slit.

According to still another aspect of the present invention, the plurality of light sources comprise monolithic devices.

According to still another aspect of the present invention, there is provided an image forming apparatus which comprises the multi-beam scanning optical system set out in the foregoing, a photosensitive member disposed on the scanned surface, a developing unit for developing, as a toner image, an electrostatic latent image formed on the photosensitive member by a light beam scanned by the multi-beam scanning optical system, a transfer unit for transferring the developed toner image onto a transfer member and a fixing unit for fixing the transferred toner image on the transfer member.

According to still another aspect of the present invention, there is provided an image forming apparatus which comprises the multi-beam scanning optical system set out in the foregoing and a controller for converting code data input from an external device into an image signal and inputting the signal to the multi-beam scanning optical system.

DETAILED DESCRIPTION OF THE PREFERRED EMBODIMENTS

[First Embodiment]

Figure 1:
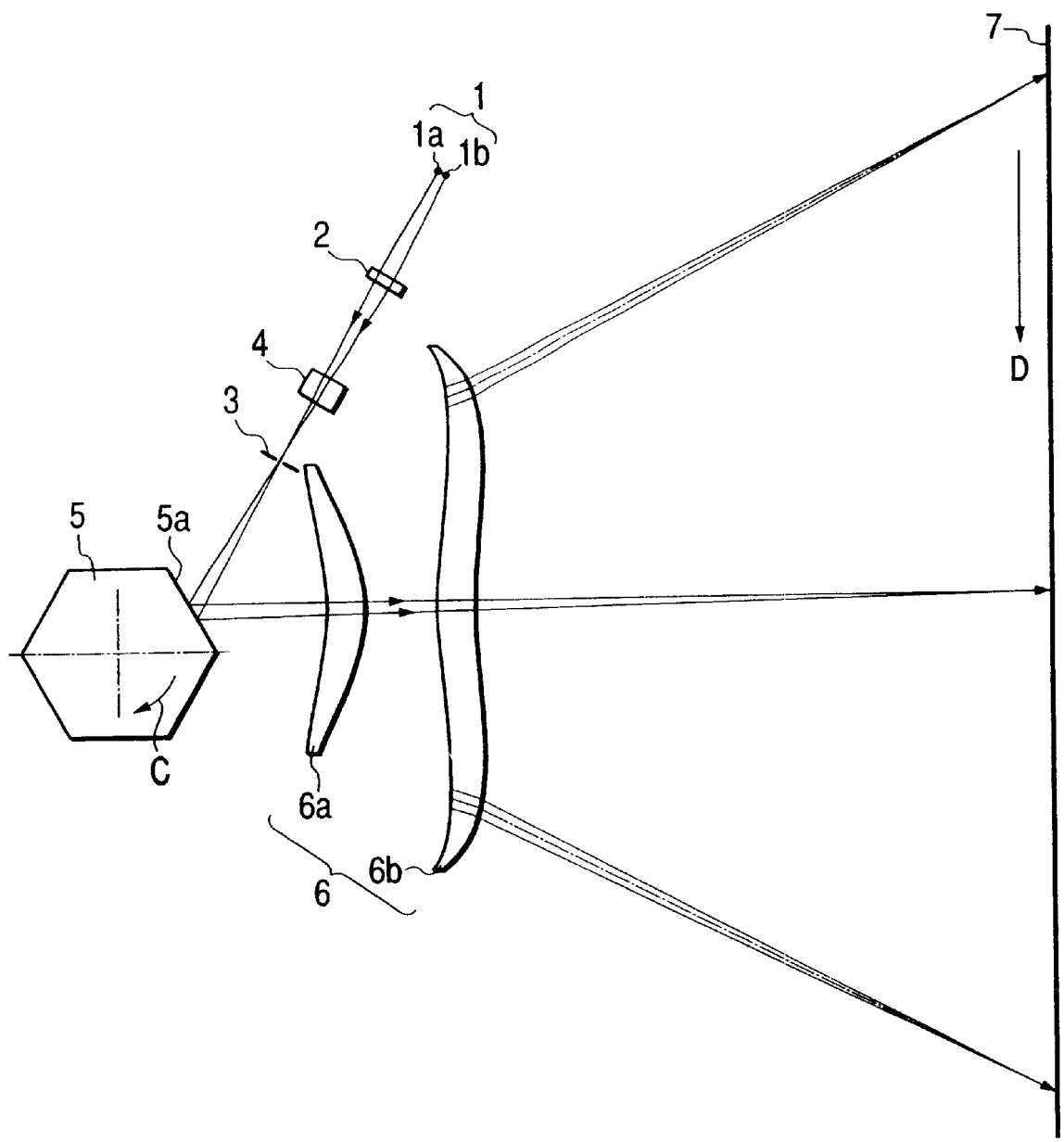
FIG. 1 is a main scanning sectional view of the first embodiment of the present invention.

FIG. 1 is a sectional view (main scanning sectional view) of the main part of the first embodiment in the main scanning direction, in which a multi-beam scanning optical system according to the present invention is applied to an image forming apparatus such as a laser beam printer or digital copying machine.

Note that in this specification, a direction in which a light beam is reflected/deflected (deflection scanning) by an optical deflector is defined as a main scanning direction, and a direction perpendicular to the optical axis of an f-θ lens system and the main scanning direction is defined as a sub-scanning direction.

Referring to FIG. 1, a light source means formed by, e.g., a monolithic multi-beam semiconductor laser (multiple light sources) having a plurality of light sources (light-emitting units) 1a and 1b. The number of light sources is not limited to two and may be three or more. A collimator lens 2 serves as a first optical system for converting a plurality of divergent light beams emitted from the multi-beam semiconductor laser 1 into substantially parallel light beams or convergent light beams. A cylindrical lens 4 serves as a second optical system having a predetermined refracting power only in a sub-scanning cross-section. A stop 3 is interposed between the collimator lens 2 and an optical deflector 5 to limit the width of incident light beams.

The optical deflector 5 serves as a deflection means and is formed by, e.g., a polygon mirror (rotary polyhedral mirror), which is rotated at a uniform speed in the direction indicated by arrow C by a driving means (not shown) such as a polygon motor.

An f-θ lens system (imaging optical system) 6 serves as a third optical system having f-θ characteristics, and is made up of first and second f-θ lenses 6a and 6b. The f-θ lens system 6 makes a deflecting surface 5a and scanned surface 7 substantially optically conjugate to each other in a sub-scanning cross-section to form a light beam based on image information, reflected/deflected by the optical deflector 5, into an image on the photosensitive drum surface 7 serving as a scanned surface.

The photosensitive drum surface 7 (recording medium surface) serves as a scanned surface.

In this embodiment, a plurality of divergent light beams emitted from the multi-beam semiconductor laser 1 are converted into substantially parallel light beams or convergent light beams by a collimator lens 2 in accordance with image information. These light beams are then incident on the cylindrical lens 4, light beams in a main scanning cross-section emerge as they are, and the cross-sectional area of the light beams is limited by the stop 3. In addition, the light beams converge in a sub-scanning cross-section and their cross-sectional area is limited by the stop 3 to be formed into an almost linear image (elongated in the scanning direction) on the deflecting surface 5a of the optical deflector 5. A plurality of light beams reflected/deflected by the deflecting surface 5a of the optical deflector are formed into spots as the photosensitive drum surface 7 by the f-θ lens system 6. By rotating the optical deflector 5 in the direction indicated by the arrow C, the light beams are scanned on the photosensitive surface 7 in the direction indicated by arrow D (main scanning direction) at a constant speed. With this operation, an image is recorded on the photosensitive drum surface 7 serving as a recording medium.

In this embodiment, the respective elements are set to satisfy $$\frac{S1 \times L1}{f1 \times f3} \leq \frac{25.4}{N1} \times \frac{1}{4} \quad (1)$$

where S1 is the maximum emission point interval between the plurality of light sources 1a and 1b in the main scanning direction, f1 is the focal length of the collimator lens 2, L1 is the distance from the stop 3 to the deflecting surface 5a of the optical deflector 5, f3 is the focal length of the f-θ lens system 6 in the main scanning direction, and N1 is the number of pixels per inch on the scanned surface 7 in the main scanning direction. This effectively prevents the occurrence of an error in the imaging positions of the light beams, emitted form the multi-beam semiconductor laser 1, on the scanned surface 7 in the main scanning direction.

Note that in this embodiment, numerical ranges are preferably set as follows:

$$\frac{S1 \times L1}{f1 \times f3} \leq \frac{25.4}{N1} \times \frac{1}{8} \quad (1a)$$

Figure 2:
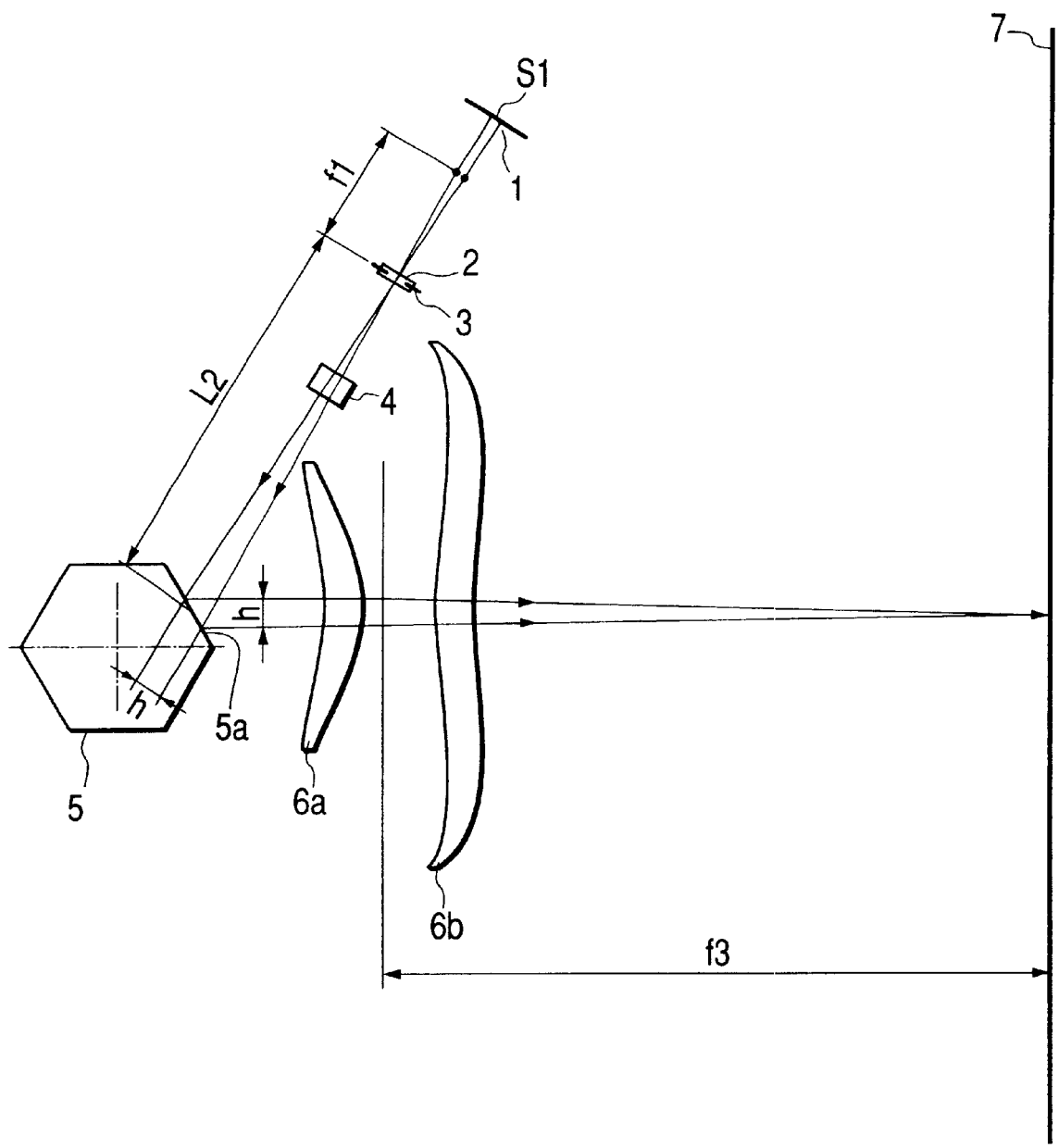
FIG. 2 is a main scanning sectional view for explaining an error amount between the imaging positions of light beams from a light source means on a scanned surface upon occurrence of a focus error in the first embodiment of the present invention.
Figure 3:
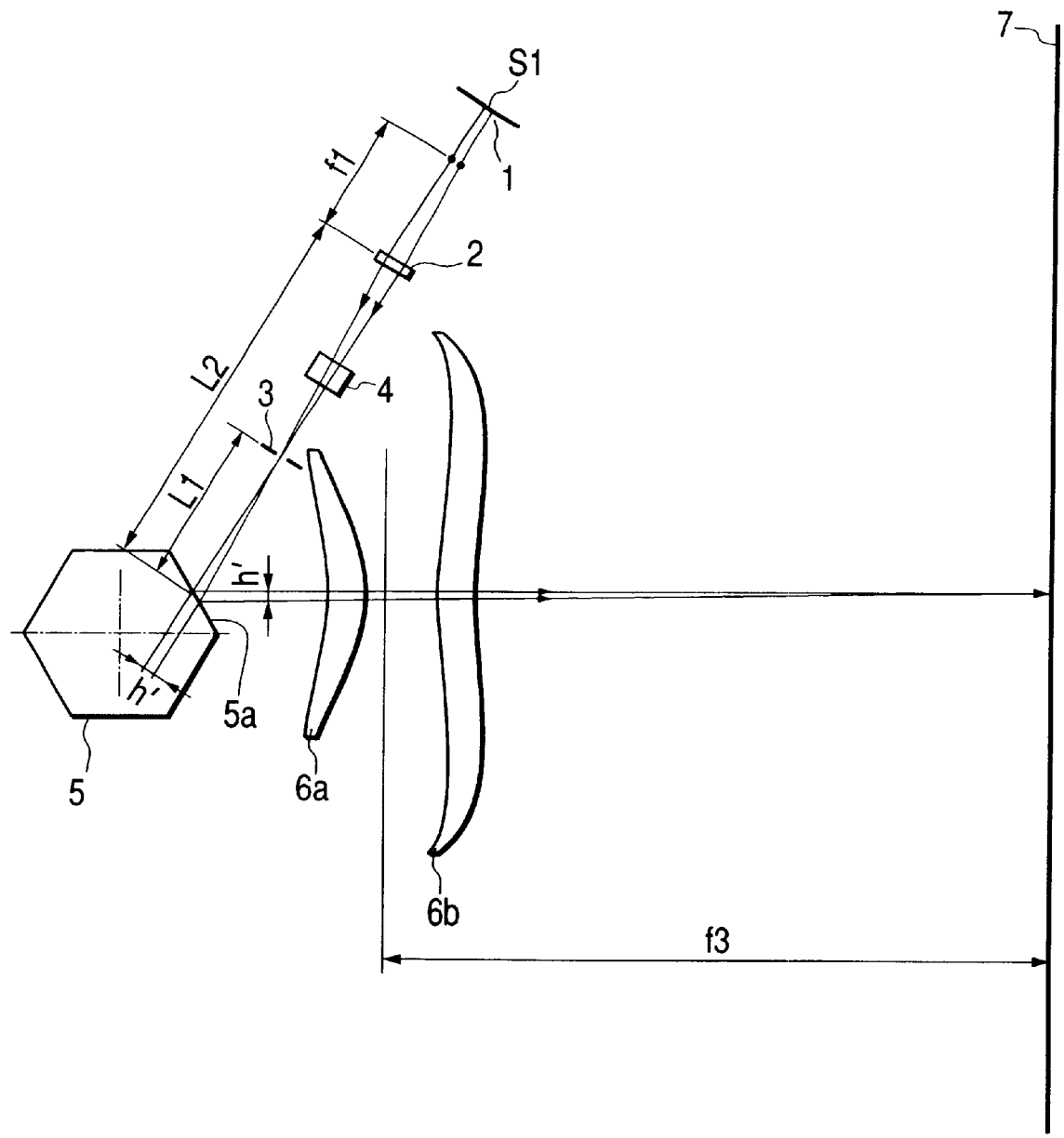
FIG. 3 is a main scanning sectional view for explaining an error amount between the imaging positions of light beams from a light source means on a scanned surface upon occurrence of a focus error in the first embodiment of the present invention.

An error between the imaging positions of light beams on the scanned surface upon occurrence of a focus error due to the above cause will be described below with reference to FIGS. 2 and 3. Referring to FIGS. 2 and 3, for the sake of descriptive simplicity, it is assumed that the number of light sources is two. As in the above description, let S1 be the maximum emission point interval between the two light sources 1a and 1b in the main scanning direction, f1 be the focal length of the collimator lens 2, L1 be the distance from the stop 3 to the deflecting surface 5a of the optical deflector 5, f3 be the focal length of the f-θ lens system 6 in the main scanning direction, and L2 be the distance from the collimator lens 2 to the deflecting surface 5a of the optical deflector 5.

In this embodiment, the width of two light beams emitted from the two light sources 1a and 1b is limited by the single stop 3.

Assume that the position of the stop 3 coincides with that of the collimator lens 2, as shown in FIG. 2. In this case, a distance h between two light beams on the deflecting surface 5a is given by $$h = \frac{S1}{f1} \times L2$$

If the stop 3 is interposed between the cylindrical lens 4 and the optical deflector 5 as shown in FIG. 3, since the angle defined by two light beams emerging from the collimator lens 2 is kept constant, a distance h' between the two light beams on the deflecting surface 5a is given by $$h' = h \times \frac{L1}{L2} = \frac{S1}{f1} \times L1$$

The two light beams reflected/deflected by the deflecting surface 5a strike the f-θ lens system 6 at the same angle. The angle defined by the two light beams emerging from the f-θ lens system 6 is therefore given by $$\frac{h'}{f3} = \frac{S1 \times L1}{f1 \times f3}$$

This represents an error amount δY between the imaging positions of two light beams when a focus error of 1 mm occurs in the main scanning direction.

The allowable value of the error amount δY between the imaging positions of two light beams varies depending on output resolution. In general, as the error amount δY exceeds ¼ the recording density determined by the output resolution, a deterioration in image quality becomes noticeable.

Focus errors in the main scanning direction are caused by various factors. Since a large focus error leads to a deterioration in the image quality of an output image, an optical system is generally designed/manufactured so as to suppress focus errors within the range of about ±2 mm.

In this embodiment, the value of the error amount δY per focus error of 1 mm is suppressed to ¼ the recording density in consideration of focus error correction performance in the main scanning direction and the influence of the error amount δY between the actual imaging positions on a deterioration in image quality.

Note that the error amount δY between the imaging positions of two light beams is not caused by only a focus error in the main scanning direction, but is also caused by, for example, an error in the leading edge of an output signal from a BD sensor (synchronization detection sensor).

For this reason, as indicated by conditional expression (1a), the value of the error amount δY per focus error of 1 mm is preferably set to ⅛ the recording density. With this setting according to conditional expression (1a), even if an error amount caused by, e.g., an error in the leading edge of an output signal from a BD sensor (synchronization detection sensor) is added to the error amount δY between the imaging positions of two light beams which is caused by a focus error in the main scanning direction, a deterioration in image quality can be effectively prevented.

Table 1 shows the optical configuration of the multi-beam scanning optical system and the aspherical coefficients of the first and second f–θ lenses 6a and 6b according to the first embodiment of the present invention.

Each member in Table 1 will be described below.

The first f–θ lens 6a is a plastic toric lens. The surfaces of the first f–θ lens 6a on the optical deflector 5 side and scanned surface 7 side are shaped such that main scanning cross-sections are aspherical, and sub-scanning cross-sections are spherical.

The second f–θ lens 6b is a plastic toric lens. The surfaces of the second f–θ lens 6b on the optical deflector 5 side and scanned surface 7 side are shaped such that main scanning cross-sections are aspherical, and sub-scanning cross-sections are spherical.

In the present invention, the surface shapes of the first and second f–θ lenses 6a and 6b are not limited to those indicated by Table 1, and these lenses may have any surface shapes as long as allowable optical characteristics can be obtained on the scanned surface 7.

In addition, the f–θ lenses in the present invention include mirrors having powers (refracting powers).

In the present invention, the number of lenses in the imaging optical system 6 is not limited to two, and may be one or three or more.

The present invention produces a noticeable effect especially in the form in which the width of light beams from the monolithic multi-beam semiconductor laser 1 is limited by the single stop 3. However, the present invention is not limited to this form.

In this case, for the sake of simplicity, the monolithic multi-beam semiconductor laser 1 has been exemplified. However, similar effects can be obtained even in the form in which light beams from single-beam semiconductor lasers are combined by a beam combining means such as a prism. In addition, a better effect can be obtained by applying the present invention to the form in which light beams from a plurality of monolithic multi-beam semiconductor lasers are combined by a beam combining means.

The optical deflector 5 in the present invention is not limited to a polygon mirror. The present invention can be applied to the form in which the deflector is a galvanometer mirror.

TABLE 1

| Wavelength Used | λ (nm) | 780 |
|---|---|---|
| Distance between Light Source and First Surface of Collimator Lens | d0 | 23.59 |
| Thickness of Collimator Lens | d1 | 3.00 |
| Distance between Second Surface of Collimator Lens and First Surface of Cylindrical Lens | d2 | 22.26 |
| Thickness of Cylindrical Lens | d3 | 6.00 |
| Distance between Second Surface of Cylindrical Lens and Polygon Surface | d4 | 48.38 |
| Distance between Stop and Polygon Surface | L1 | 31.95 |
| Distance between Polygon Surface and First Surface of First f-θ Lens | d5 | 24.50 |
| Thickness of First f-θ Lens | d6 | 8.00 |
| Distance between Second Surface of First f-θ Lens and First Surface of Second f-θ Lens | d7 | 15.37 |
| Thickness of Second f-θ Lens | d8 | 7.00 |
| Distance between Second Surface of Second f-θ Lens and Scanned Surface | d9 | 119.08 |
| Refractive Index of Collimator Lens | Ncol | 1.76203 |
| Refractive Index of Cylindrical Lens | Ncyl | 1.51072 |
| Refractive Index of First f-θ Lens | Nlens1 | 1.52420 |
| Refractive Index of Second f-θ Lens | Nlens2 | 1.52420 |
| Radius of Curvature of First Surface of Collimator Lens | R1col | 182.212 |
| Radius of Curvature of Second Surface of Collimator Lens | R2col | −20.831 |
| Focal Length of Collimator Lens | fcol | 24.636 |
| Radius of Curvature of First Surface of Cylindrical Lens (Main Scanning Direction) | R1cyl (m) | 0.000 |
| Radius of Curvature of First Surface of Cylindrical Lens (Sub-Scanning Direction) | R1cyl (s) | 26.993 |
| Radius of Curvature of Second Surface of Cylindrical Lens | R2cyl | 0.000 |
| Focal Length of f-θ Lens | ffθ | 136.237 |
| Emission Point Interval | d | 0.090 |
| Incident Angle of Polygon Mirror | α | 60 |
| Maximum Exit Angle of Polygon Mirror | θmax | 45 |
| Polygon Mirror φ 40 Hexahedron | | |
| Stop Diameter  Main Scanning Direction 3.08 × Sub-Scanning Direction 1.34 Elliptic Shape | | |

| f-θ Lens Shape | |
|---|---|
| First Surface | Second Surface |

| First f-θ Lens | | | |
|---|---|---|---|
| R | −62.044 | R | −35.199 |
| k | −4.611E + 00 | k | −2.130E + 00 |
| B4 | 2.852E − 06 | B4 | −4.482E − 07 |
| B6 | 0.000E + 00 | B6 | 2.061E − 09 |
| B8 | 0.000E + 00 | B8 | −2.364E − 14 |
| B10 | 0.000E + 00 | B10 | 0.000E + 00 |
| r | −67.000 | r | −62.050 |
| D2 | 0.000E + 00 | D2u | −1.607E − 03 |
| D4 | 0.000E + 00 | D4u | 2.360E − 06 |
| D6 | 0.000E + 00 | D6u | −1.320E − 09 |
| D8 | 0.000E + 00 | D8u | 0.000E + 00 |

TABLE 1-continued

| | | | |
|---|---|---|---|
| D10 | 0.000E + 00 | D10u | 0.000E + 00 |
| | | D21 | −1.840E − 03 |
| | | D41 | 3.648E − 06 |
| | | D61 | −2.625E − 09 |
| | | D81 | 0.000E + 00 |
| | | D101 | 0.000E + 00 |
| | | Second f−θ Lens | |
| R | 88.196 | R | 86.700 |
| k | −5.328E − 01 | k | −1.696E + 01 |
| B4 | −4.527E − 06 | B4 | −3.217E − 06 |
| B6 | 2.280E − 09 | B6 | 1.395E − 09 |
| B8 | −7.458E − 13 | B8 | −3.761E − 13 |
| B10 | 8.424E − 17 | B10 | 2.166E − 17 |
| r | −37.273 | r | −13.928 |
| D2 | 3.003E − 03 | D2 | 1.145E − 03 |
| D4 | 2.397E − 06 | D4 | −8.520E − 07 |
| D6 | 9.137E − 10 | D6 | 4.629E − 10 |
| D8 | 4.983E − 14 | D8 | −1.625E − 13 |
| D10 | 1.997E − 17 | D10 | 2.534E − 17 |

Assume that the intersection of the lens surface of each of the first and second f−θ lenses 6a and 6b and the optical axis is an origin, the optical axis direction is the X-axis, an axis perpendicular to the optical axis in a main scanning cross-section is the Y-axis, and an axis perpendicular to the optical axis in a sub-scanning cross-section is the Z-axis. In this case, the aspherical shape of each lens in a main scanning cross-section is given by $$x = \frac{y^2/R}{1 + (1 - (1+k)(y/R)^2)^{1/2}} + B_4 y^4 + B_6 y^6 + B_8 y^8 + B_{10} y^{10}$$

where R is the radius of curvature, and k and $B_4$ to $B_{10}$ are aspherical coefficients.

A sub-scanning cross-section of each lens is shaped such that when a lens surface coordinate in the main scanning direction is represented by y, a radius of curvature r' is given by $$r' = r(1 + D_2 y^2 + D_4 y^4 + D_6 y^6 + D_8 y^8 + D_{10} y^{10})$$

where r is the radius of curvature on the optical axis, and $D_2$ to $D_{10}$ are coefficients.

In this case, if each coefficient varies depending on the sign of the value of y, the radius of curvature r' is calculated by using $D_{2u}$ to $D_{10u}$ with a subscript u as coefficients when the value of y is positive, whereas the radius of curvature r' is calculated by using $D_{2l}$ to $D_{10l}$ with a subscript 1 as coefficients when the value of y is negative.

If the recording density on the scanned surface of an image forming apparatus, e.g., a laser beam printer or digital copying machine, using the multi-beam scanning optical system according to this embodiment in the main scanning direction is set to 1,200 DPI, the respective values in conditional expression (1) are given as follows:

$$\frac{S1 \times L1}{f1 \times f3} = \frac{0.09 \times 31.95}{24.636 \times 136.237} = 0.000857$$

$$\frac{25.4}{NI} \times \frac{1}{4} = \frac{25.4}{1200} \times \frac{1}{4} = 0.00529$$

Conditional expression (1) given above is therefore satisfied:

$$\frac{S1 \times L1}{f1 \times f3} = \leq \frac{25.4}{NI} \times \frac{1}{4} \quad (1)$$

In the multi-beam scanning optical system according to this embodiment, if parameters, e.g., the maximum emission point interval S1 between the plurality of light sources 1a and 1b in the main scanning direction, the focal length f1 of the collimator lens 2, the distance L1 from the stop 3 to the deflecting surface 5a of the optical deflector 5, and the focal length f3 of the f−θ lens system 6 in the main scanning direction, are set to satisfy conditional expression (1), the error amount δY between the imaging positions of light beams from the two light sources 1a and 1b can be suppressed to an amount as small as 0.857 μm even when a focus error of 1 mm occurs in the main scanning direction.

As described above, according to this embodiment, by properly setting the respective elements constituting the multi-beam scanning optical system, an error between the imaging positions of light beams from a plurality of light sources on the scanned surface 7 can be effectively reduced without requiring any complicated adjustment. This makes it possible to obtain a high-quality image at high speed.

[Second Embodiment]

Figure 4:
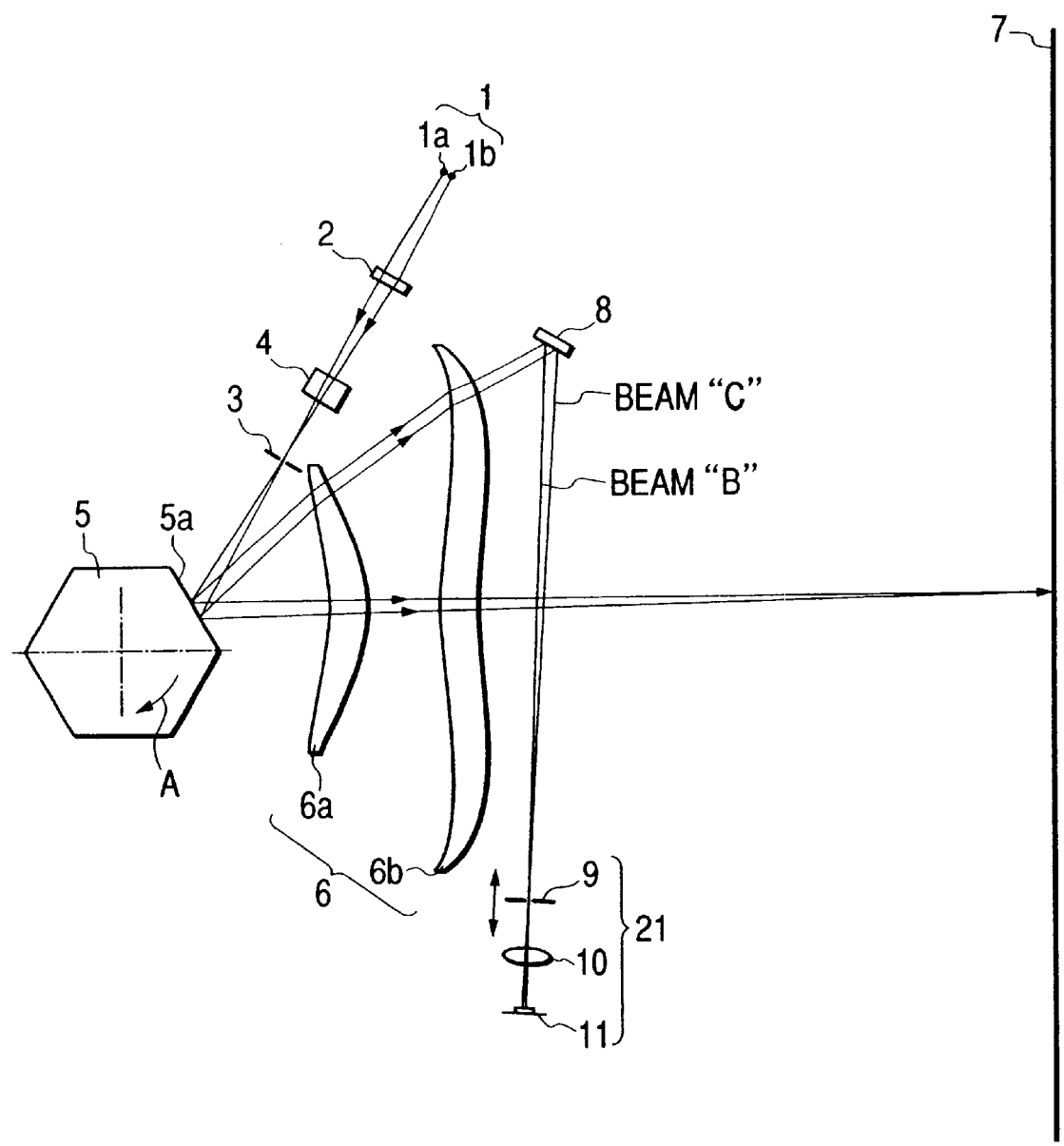
FIG. 4 is a main scanning sectional view of the second embodiment of the present invention.

FIG. 4 is a sectional view (main scanning sectional view) showing the main part of the second embodiment in the main scanning direction, in which a multi-beam scanning optical system according to the present invention is applied to an image forming apparatus such as a laser beam printer or digital copying machine. The same reference numerals as in FIG. 1 denote the same parts in FIG. 4.

This embodiment differs from the first embodiment in that in the multi-beam scanning optical system having a write position sync signal detection means 21, a focus error is also corrected at an image height used for the detection of a write position sync signal. Other arrangements and optical functions are the same as those in the first embodiment, and hence the second embodiment has effects similar to those of the first embodiment.

Referring to FIG. 4, a reflection means 8 is formed by a bending mirror (to be referred to as a "BD mirror" hereinafter). The BD mirror 8 reflects, toward a write position sync signal detection element 11, a light beam (BD light beam) for the detection of a write position sync signal for adjusting the timing at a scanning start position on a photosensitive drum 7.

A slit (to be referred to as a "BD slit" hereinafter) 9 is placed at a position equivalent to the photosensitive drum 7. The BD slit 9 is movable in the direction of the center of a light beam incident on the BD slit 9.

An imaging lens (to be referred to as a "BD lens" hereinafter) 10 serves as an imaging means for making the BD mirror 8 and the write position sync signal detection element 11 optically conjugate to each other, and corrects a tilt of the surface in the BD mirror 8.

The write position sync signal detection element 11 is an optical sensor (to be referred to as a "BD sensor" hereinafter). In this embodiment, the timing at the scanning start position for image recording on the photosensitive drum 7 is adjusted by using a write position sync signal (BD signal) obtained by detecting an output signal from the BD sensor 11.

Note that each of the BD slit 9, BD lens 10, BD sensor 11, and the like forms one element of the write position sync signal detection means 21. The write position sync signal detection means 21 controls the timing at a scan start position on the photosensitive drum 7 with respect to each of light beams emitted from a plurality of light sources 1a and 1b.

In this embodiment, a light beam (BD light beam) used to detect a write position sync signal (BD signal) passes through an end portion of the lens effective portion of an f–θ lens system 6. If first and second f–θ lenses 6a and 6b constituting the f–θ lens system 6 are formed by injection molding using a plastic material, an error in the surface precision of an end portion of a lens effective portion tends to become large. Consequently, a focus error at an image height used for the detection of a write position sync signal tends to become larger than a focus error in the image effective portion.

Figure 5:
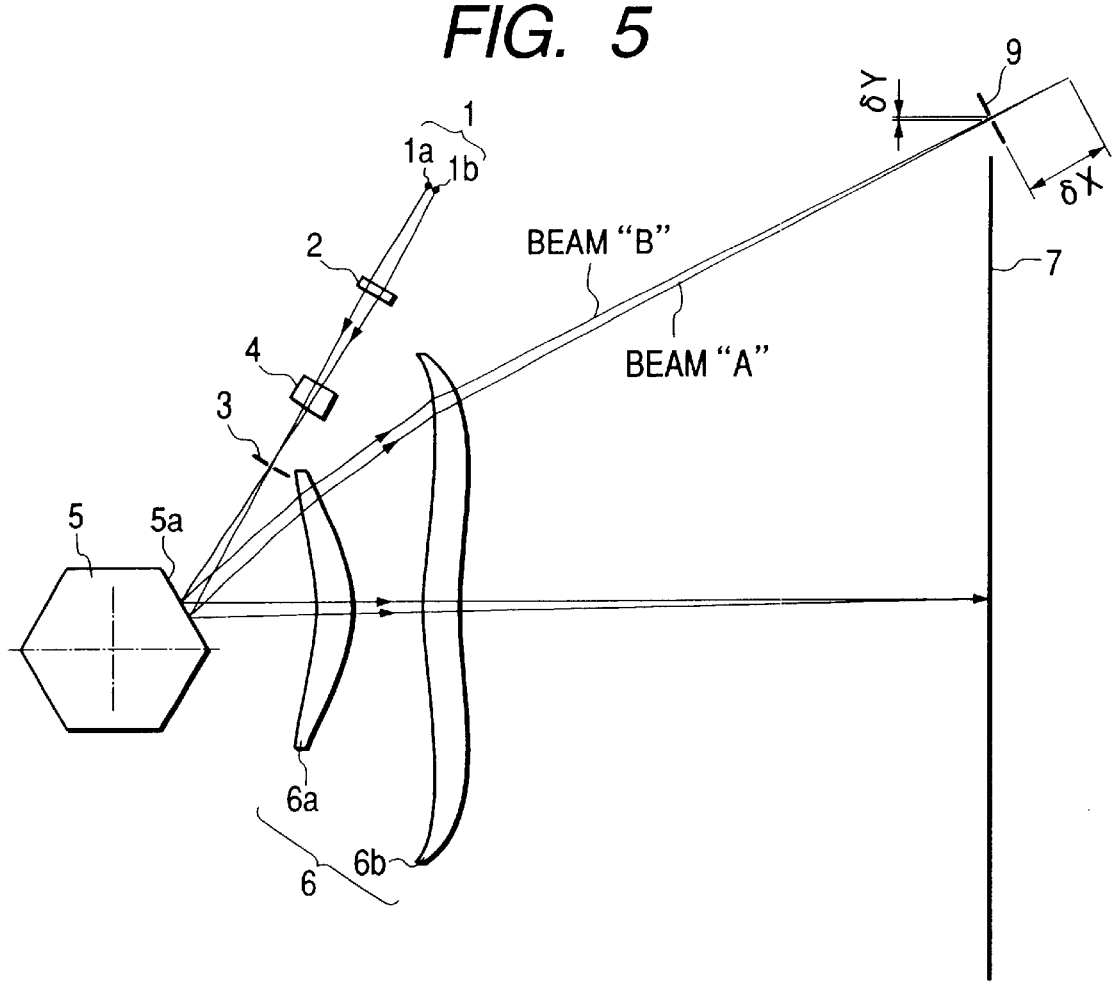
FIG. 5 is a main scanning sectional view for explaining the state of two beams upon occurrence of a focus error at an image height used for the detection of a write position sync signal in the second embodiment of the present invention.

Assume that no focus error occurs in the image effective portion, and a focus error occurs at an image height used for the detection of a write position sync signal. FIG. 5 shows this state.

For the sake of illustrative convenience, FIG. 5 shows a state wherein a BD light beam used to detect a write position sync signal is not bent by a mirror. If a focus error occurs at an image height used for the detection of a write position sync signal, beams A and B are not overlaid at the position of the BD slit 9, resulting in an error δY, as shown in FIG. 5. If a write position sync signal is detected by using each of the beams A and B in this state, the imaging positions of the beams A and B shift from each other by δY in the image effective portion.

In this embodiment, to avoid such an inconvenience, the BD slit 9 is configured to be movable in the direction of the center of a BD light beam used for the detection of a write position sync signal. The BD slit 9 is moved in the direction of the center of a BD light by an actual focus error amount δx to correct an error between the imaging positions of the beams A and B in the image effective area.

[Third Embodiment]

Figure 6:
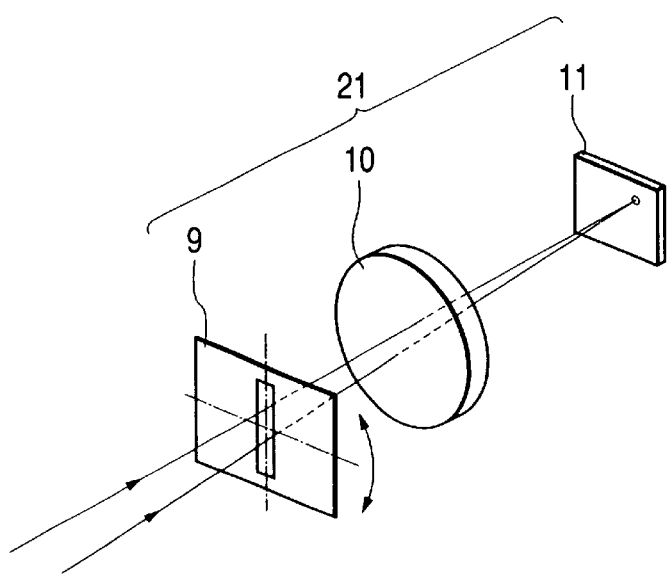
FIG. 6 is a schematic view showing the main part of a write position sync signal detection means according to the third embodiment of the present invention.
Figure 7:
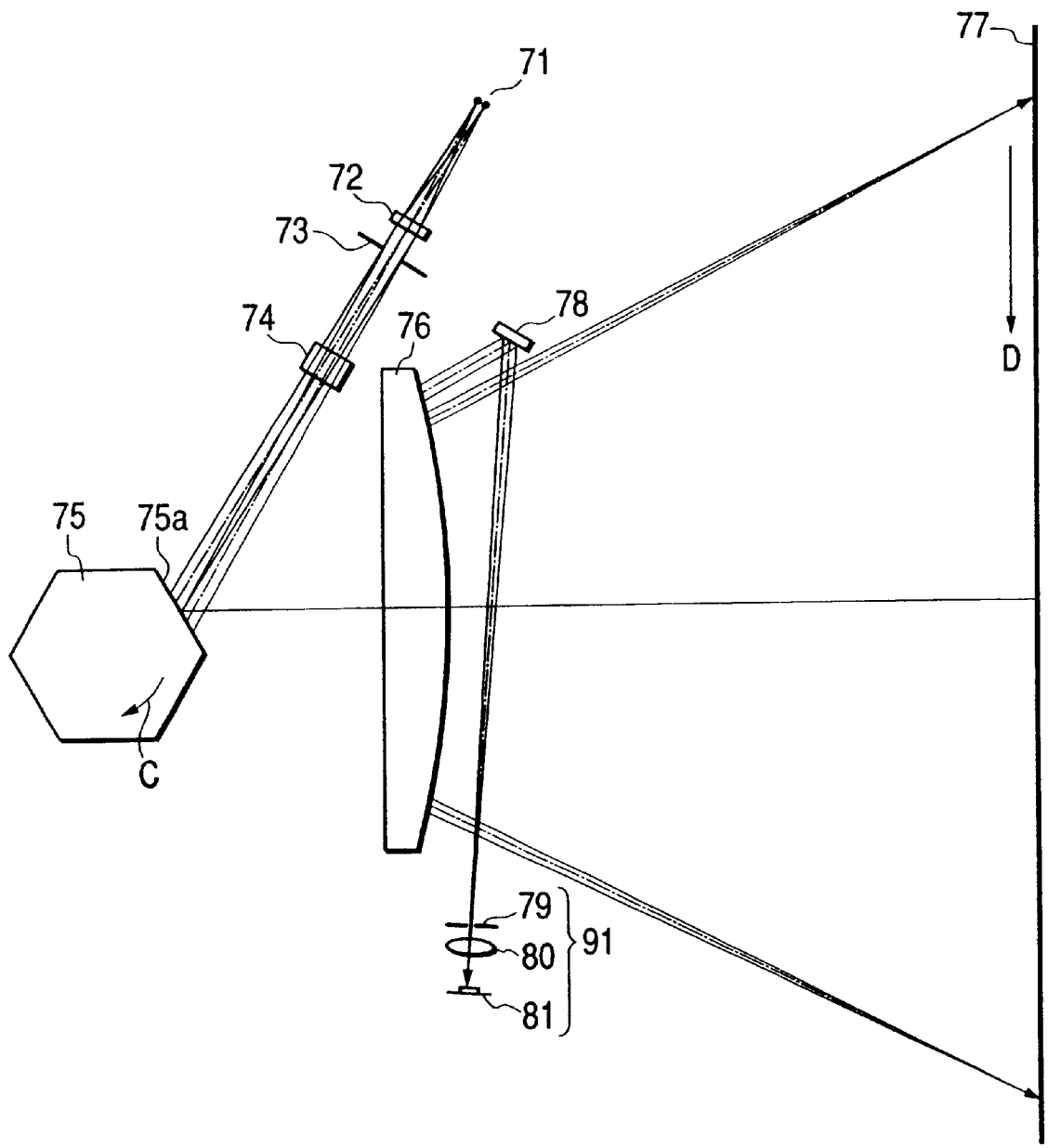
FIG. 7 is a main scanning sectional view of a conventional multi-beam scanning optical system.
Figure 8:
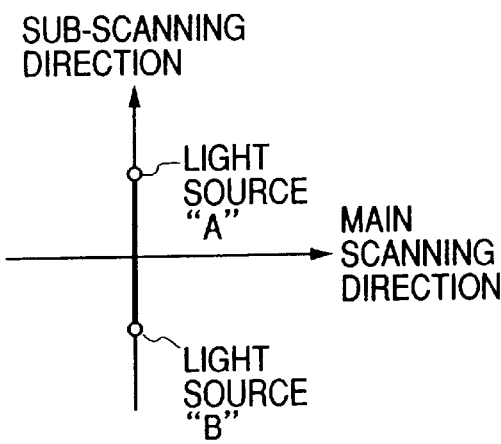
FIG. 8 is a view for explaining the positions of a plurality of light sources in a conventional multi-beam scanning optical system.
Figure 9:
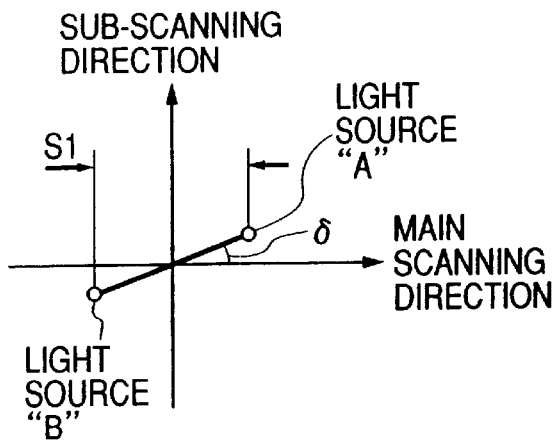
FIG. 9 is a view for explaining the positions of a plurality of light sources in a conventional multi-beam scanning optical system.
Figure 10:
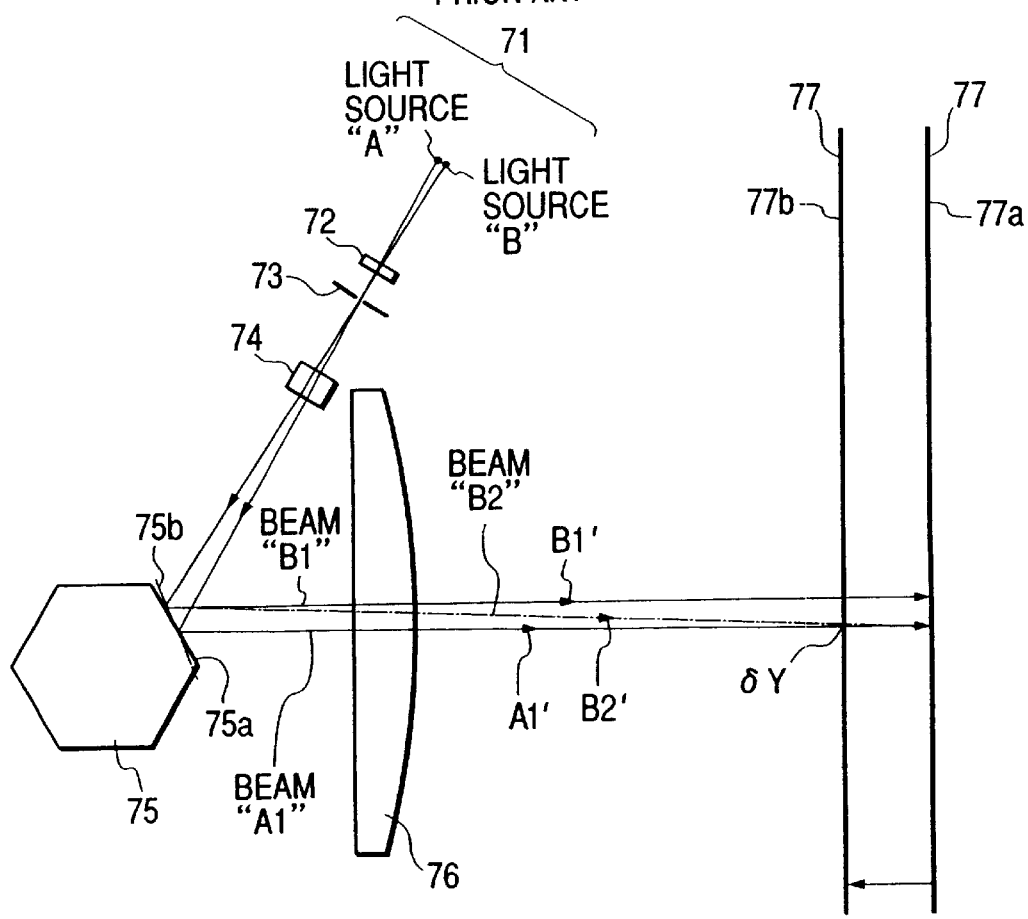
FIG. 10 is a main scanning sectional view for explaining a case wherein a focus error has occurred in the multi-beam scanning optical system.

FIG. 6 is a schematic view showing the main part of a write position sync signal detection means according to the third embodiment of the present invention. The same reference numerals as in FIG. 4 denote the same parts in FIG. 6.

This embodiment differs from the second embodiment in that a BD slit 9 of a write position sync signal detection means 21 is configured to be pivotal in a cross-section almost perpendicular to the center of a BD light beam used for the detection of a write position sync signal. Other arrangements and optical functions are the same as those in the second embodiment, and hence the third embodiment has effects similar to those of the second embodiment.

In the second embodiment, an error between the imaging positions of the beams A and B is corrected by moving the BD slit 9 in the direction of the center of a BD light beam by an amount corresponding to the focus error amount δx. In the third embodiment, an error between the beams A and B is corrected by pivoting the BD slit 9 about the center of a BD light beam, which is used to detect a write position sync signal, in a cross-section substantially perpendicular to the center of the BD light beam.

Assume that a focus error of 3 mm has occurred at an image height used for the detection of a write position sync signal. As described above, when a focus error of 1 mm occurs in the main scanning direction, an error amount ΔY between the imaging positions of light beams from two light sources 1a and 1b is 0.857 μm. If, therefore, a focus error of 3 mm occurs, the imaging positions shift from each other by 2.571 μm. Since the distance between the two spots on the BD slit 9 surface is 21.17 μm when the recording density in the main scanning direction is 1,200 DPI, the error between the imaging positions of the beams A and B can be corrected by pivoting the BD slit 9 by the amount given by $$\tan^{-1} = \frac{2.571}{21.17} = 6.924°$$

In each of the second and third embodiments has been described on the assumption that a focus error has occurred at an image height used for the detection of a write position sync signal. Obviously, however, even if the present invention is applied to other cases, e.g., a case wherein errors have occurred between the imaging positions of the beams A and B throughout the entire image effective area due to a positional error or the like between the scanning optical system and the scanned surface, similar effects can be obtained.

In each of the second and third embodiments, write position sync signals are detected with respect to all light beams emitted from the light source means 1. However, the present invention is not limited to this. For example, the present invention can be applied to even a case wherein a write position sync signal is detected for only one light beam of the plurality of light beams in the same manner as the second and third embodiments.

Figure 11:
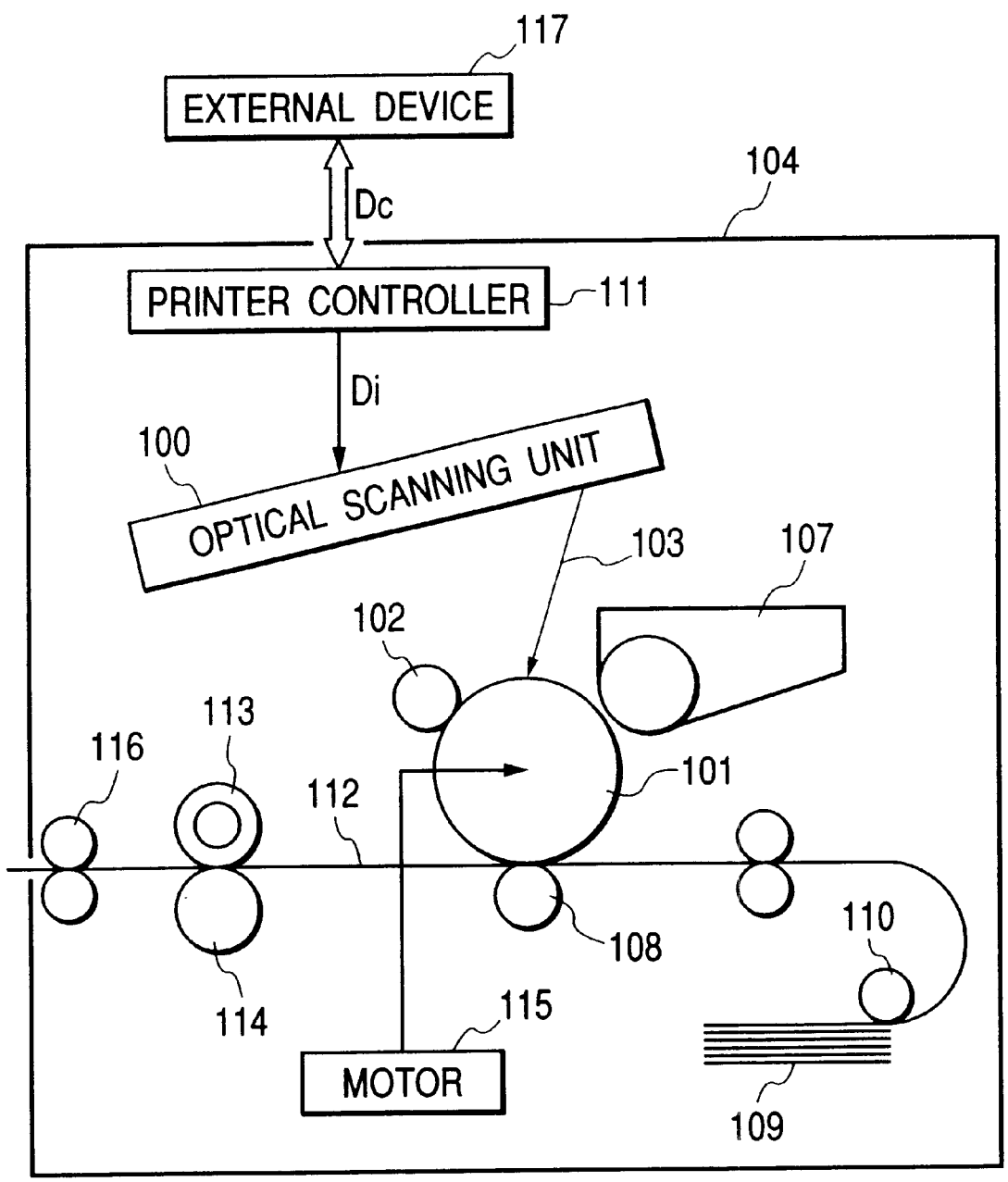
FIG. 11 is a view showing an image forming apparatus according to the present invention.

FIG. 11 is a sectional view of the main part of an image forming apparatus according to an embodiment of the present invention. Referring to FIG. 11, an image forming apparatus 104 receives code data Dc from an external device 117 such as a personal computer. This code data Dc is converted into image data (dot data) Di by a printer controller 111 in the apparatus. This image data Di is input to an optical scanning unit 100 having an arrangement like the one described in each of the first to third embodiments. A light beam 103 modulated in accordance with the image data Di emerges from the optical scanning unit 100, and the photosensitive surface of a photosensitive drum 101 is scanned in the main scanning direction with the light beam 103.

The photosensitive drum 101 serving as an electrostatic latent image carrier (photosensitive member) is rotated clockwise by a motor 115. Upon this rotation, the photosensitive surface of the photosensitive drum 101 moves with respect to the light beam 103 in the sub-scanning direction perpendicular to the main scanning direction. A charging roller 102 for uniformly charging the surface of the photosensitive drum 101 is placed above the photosensitive drum 101 such that the surface of the charging roller 102 is in contact with the photosensitive drum 101. The surface of the photosensitive drum 101 charged by the charging roller 102 is irradiated with the light beam 103 scanned by the optical scanning unit 100.

As described above, the light beam 103 is modulated on the basis of the image data Di. By irradiating the surface of the photosensitive drum 101 with the light beam 103, an electrostatic latent image is formed on the surface of the photosensitive drum 101. This electrostatic latent image is developed as a toner image by a developing unit 107 which is placed downstream from the radiation position of the light beam 103 in the rotational direction of the photosensitive drum 101 so as to be in contact with the photosensitive drum 101.

The toner image developed by the developing unit 107 is transferred onto a paper sheet 112 as a transfer medium by a transfer roller 108 placed below the photosensitive drum 101 to oppose the photosensitive drum 101. The paper sheet 112 is stored in a paper cassette 109 in front of the photosensitive drum 101 (on the right side in FIG. 11). However, a paper sheet can also be manually fed. A feed roller 110 is placed at an end portion of the paper cassette 109 to feed the paper sheet 112, stored in the paper cassette 109, onto a convey path.

The paper sheet 112 on which the unfixed toner image is transferred in the above manner is further conveyed to a fixing unit behind (the left side in FIG. 11) the photosensitive drum 101. The fixing unit is made up of a fixing roller 113 incorporating a fixing heater (not shown) and a press roller 114 which is pressed against the fixing roller 113. The fixing unit fixes the unfixed toner image on the paper sheet 112 conveyed from the transfer unit by heating the paper sheet 112 while pressing it between the fixing roller 113 and the pressing portion of the press roller 114. In addition, a paper discharge roller 116 is placed behind the fixing roller 113 to discharge the image-fixed paper sheet 112 outside the image forming apparatus.

Although not shown in FIG. 11, the printer controller 111 controls the respective components in the image forming apparatus, including the motor 115, and the polygon motor in the optical scanning unit (to be described later) as well as data conversion described above.

According to the present invention, as descried above, there are provided a multi-beam scanning optical system which can effectively reduce an error between the imaging positions of light beams from a plurality of light sources in the main scanning direction without requiring any complicated adjustment and obtain a high-quality image at high speed by properly setting the relationship between the maximum emission point interval between the plurality of light sources in the main scanning direction, the focal length of the collimator lens, the distance from the stop to the deflecting surface, and the focal length of the f–θ lens system within a desired range, and an image forming apparatus using this scanning optical system.

What is claimed is:

1. A multi-beam scanning optical system comprising:

light source means having a plurality of light sources spaced apart from each other at least in a main scanning direction;

a first optical system for converting a plurality of divergent light beams emitted from said light source means;

deflection means having a deflecting surface for reflecting/deflecting the plurality of light beams in the main scanning direction;

a stop which is interposed between said first optical system and said deflection means to limit a width of incident light beams; and a second optical system for forming the plurality of light beams reflected/deflected by said deflection means into images on a scanned surface, wherein letting S1 be an emission point interval between the plurality of light sources in the main scanning direction sources in the main scanning direction, f1 be a focal length of said first optical system, L1 be a distance from said stop to the deflecting surface of said deflection means, f3 be the focal length of said second optical system in the main scanning direction, and N1 be the number of pixels per inch on the scanned surface in the main scanning direction, a condition given by $$\frac{S1 \times L1}{f1 \times f3} \le \frac{25.4}{N1} \times \frac{1}{4}$$

is satisfied.

2. A system according to claim 1, wherein said multi-beam scanning optical system further comprises write position sync signal detection means for controlling a timing at a scanning start position on the scanned surface by using one of the plurality of light beams reflected/deflected by the deflection means, and wherein the timing at the scanning start position on the scanned surface with respect to one of the plurality of light beams emitted from said light source means is controlled.

3. A system according to claim 1, wherein said multi-beam scanning optical system further comprises write position sync signal detection means for controlling a timing at a scanning start position on the scanned surface by using all the plurality of light beams reflected/deflected by the deflection means, and wherein the timing at the scanning start position on the scanned surface with respect to the plurality of light beams emitted from said light source means is controlled.

4. A system according to claim 2 or 3, wherein said write position sync signal detection means has a slit, and the slit can move in a direction of the center of a light beam incident on the slit.

5. A system according to claim 2 or 3, wherein said write position sync signal detection means has a slit, and the slit can pivot within a cross-section substantially perpendicular to the center of a light beam incident on the slit.

6. A system according to claim 1, wherein the plurality of light sources comprise monolithic devices.

7. An image forming apparatus comprising:

said multi-beam scanning optical system defined in claim 1;

a photosensitive member disposed on the scanned surface;

a developing unit for developing, as a toner image, an electrostatic latent image formed on said photosensitive member by a light beam scanned by said multi-beam scanning optical system;

a transfer unit for transferring the developed toner image onto a transfer member; and a fixing unit for fixing the transferred toner image on the transfer member.

8. An image forming apparatus comprising:

said multi-beam scanning optical system defined in claim 1; and a controller for converting code data input from an external device into an image signal and inputting the signal to said multi-beam scanning optical system.

9. A system according to claim 1, wherein said deflection means is a polyhedral mirror.

* * * * *

UNITED STATES PATENT AND TRADEMARK OFFICE
CERTIFICATE OF CORRECTION

PATENT NO.    : 6,489,982 B2
DATED         : December 3, 2002
INVENTOR(S)   : Yoshihiro Ishibe It is certified that error appears in the above-identified patent and that said Letters Patent is hereby corrected as shown below:

Column 5,
Line 59, "deflector" should read -- deflector 5 --.

Column 9,
Line 45, "$D_1 0$" should read -- $D_{10}$ --.

Signed and Sealed this

Twenty-fifth Day of November, 2003

JAMES E. ROGAN
*Director of the United States Patent and Trademark Office*